Dec. 15, 1931.  V. H. MICHAELIS ET AL  1,836,485
BAKER'S APPLIANCE
Filed March 14, 1931  2 Sheets-Sheet 1
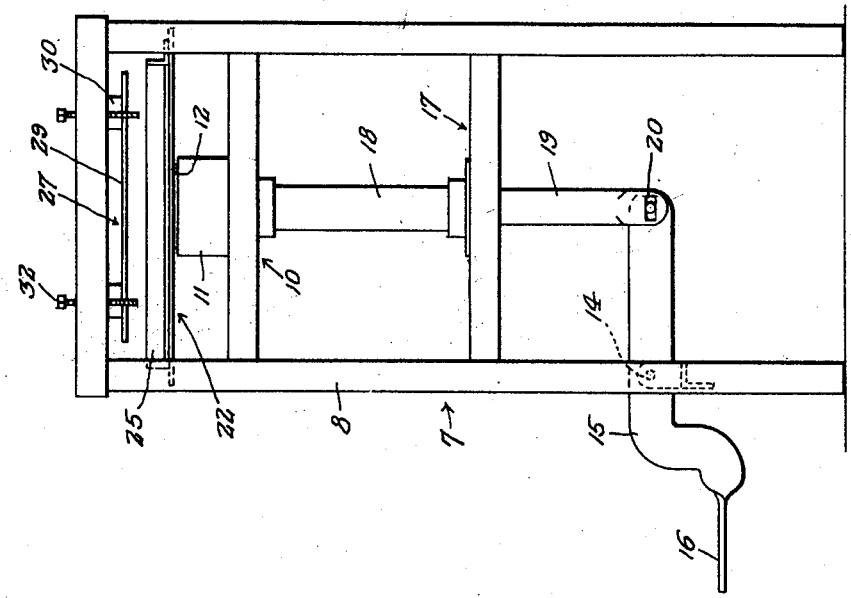
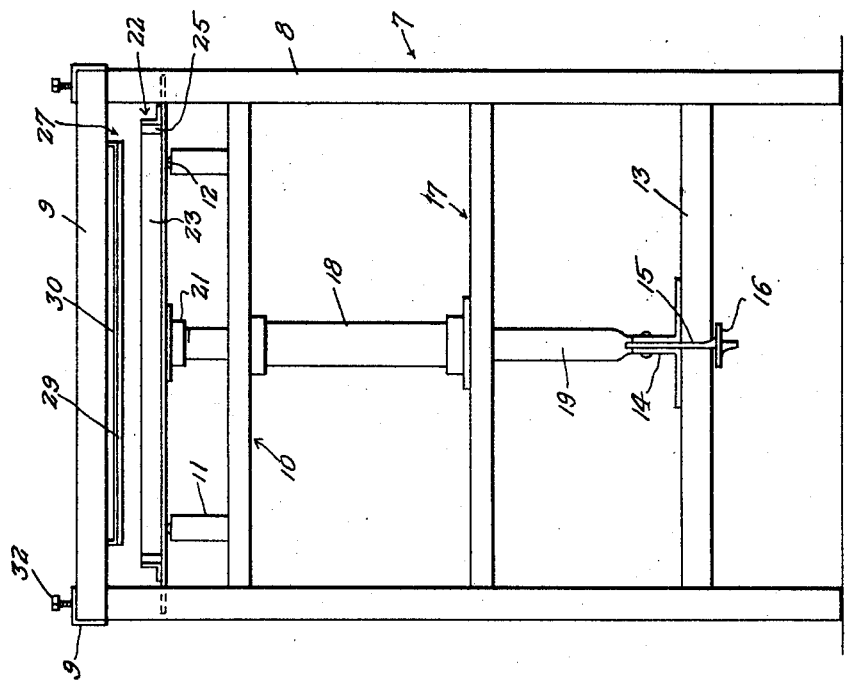
Inventor
Victor H. Michaelis,
William I. Jasinsky,
By *Clarence A. O'Brien*
Attorney Dec. 15, 1931.   V. H. MICHAELIS ET AL   1,836,485
BAKER'S APPLIANCE
Filed March 14, 1931   2 Sheets-Sheet 2
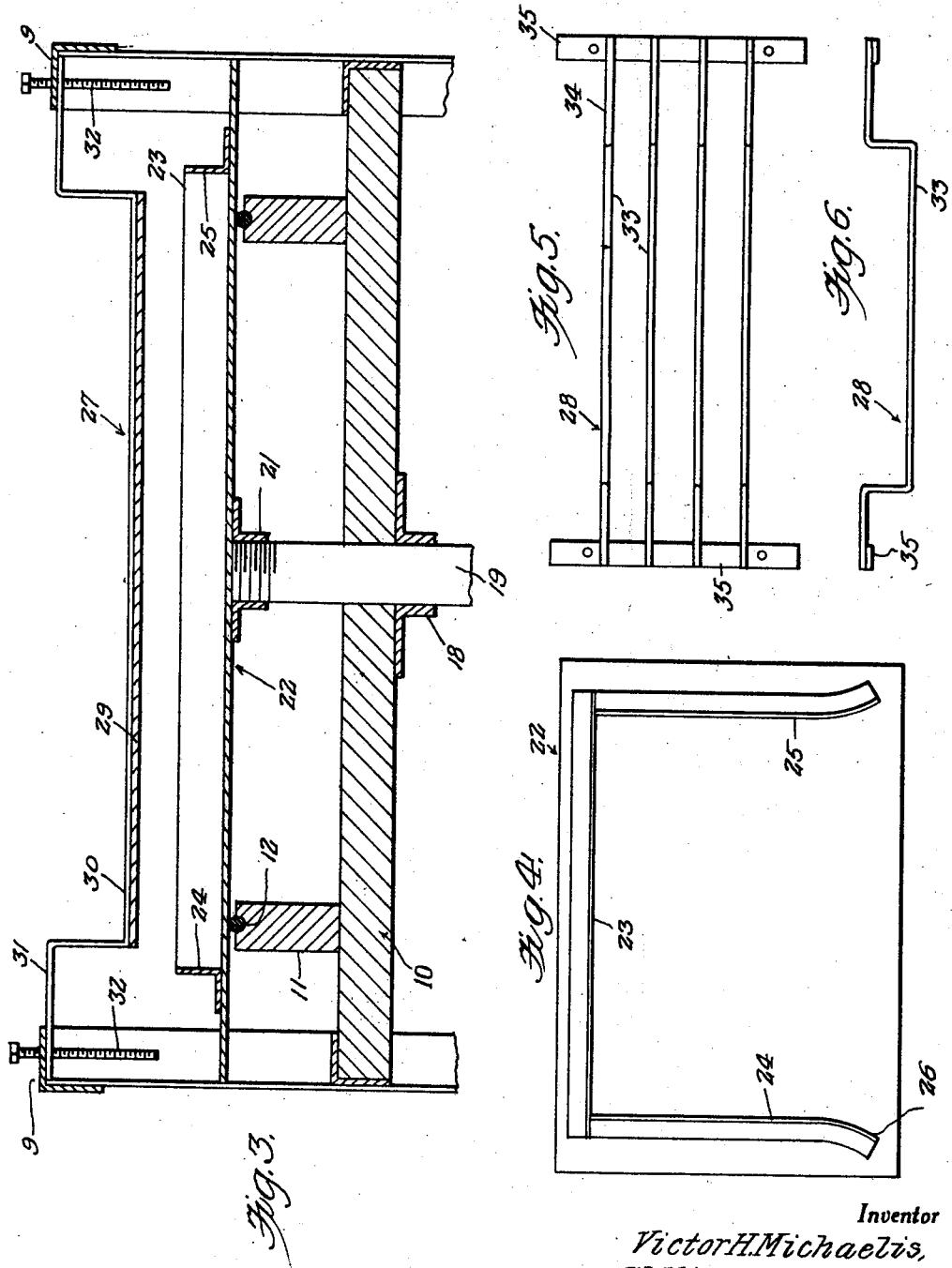
Inventor
*Victor H. Michaelis,*
*William I. Jasinsky,*
By *Clarence A. O'Brien*
Attorney Patented Dec. 15, 1931

1,836,485

UNITED STATES PATENT OFFICE

VICTOR HERMAN MICHAELIS AND WILLIAM IRVING JASINSKY, OF MILWAUKEE, WISCONSIN

BAKER'S APPLIANCE

Application filed March 14, 1931. Serial No. 522,754.

This invention relates to an improved appliance or apparatus for use in a bakery for compressing and flattening buns; and secondly, for creasing rolls.

Briefly stated, the improved structure is characterized by a support somewhat in the nature of a table provided with a top plate against which the buns are firmly pressed for compressing and flattening.

On this table is a perpendicular, reciprocatory lifting rod having operating means at its bottom, and a carrier at its top located in parallelism beneath the top plate and constructed to accommodate a pan containing a multiplicity of buns.

A feature of the invention is the simple arrangement utilizing a plunger-like carrier to accommodate the pan of buns or rolls as the case may be, with conveniently located foot-operated means, together with detachable devices for the top of the structure, which may be alternately and optionally used for flattening and creasing the dough product whether they be in the form of buns or rolls.

The specific details and relative arrangement and association will become more readily apparent from the following description and drawings.

In the drawings:

Figure 1 is a front elevational view of a machine or apparatus constructed in accordance with the present invention.

Figure 2 is an end view thereof.

Figure 3 is a view in section.

Figure 4 is a top plan view of the carrier plate.

Figure 5 is a bottom plan view of the roll impression or creasing device.

Figure 6 is a longitudinal edge view of the device shown in Figure 5.

In the drawings, the support is generally designated by the numeral 7 and comprises an open-work table including supporting legs 8 in the form of angle irons. At the top is a frame 9 made up of similar irons. Just below the top is a partition member 10 including a marginally reinforced board having a central opening.

Supported on the top of this board at longitudinally spaced points are blocks 11 which constitute stops and which are provided with resilient abutments 12. Between the legs at the front and near the lower portion thereof is a supporting bar 13 provided with brackets 14 to accommodate an operating crank 15 having a suitably formed foot treadle 16.

At the center is a similar divider or partition device 17 and between this and the top partition device 10 is a vertical guide tube 18 through which the reciprocatory operating shaft or rod 19 is slidable. The bifurcated lower end 20 is connected with the inner end of the pedal operated crank 15. The upper screw-threaded end extends through the guide opening in the board 10 and is threaded into a collar 21 carried by the underside of the carrier plate 22.

This plate 22 is provided with a rack made up of a series of three angle irons 23, 24 and 25 respectively. This forms an open front rack to accommodate the pan (not shown) containing the dough for baking the buns. It will be noticed that the outer end of the irons 24 and 25 are flared outwardly in opposite directions as indicated at 26 to facilitate insertion of the pans.

The downward movement of this carrier plate 22 is limited by the abutment members or elements 12. There are two kinds of attachments used in connection with this table and one is generally designated by the numeral 27, this being designed for flattening and compressing buns. The other is represented by the numeral 28 and this is designed for impressing or creasing rolls.

The device 27 comprises a backing horizontally disposed plate 29 mounted on the U-shaped portion 30 of the supporting arms 31. These arms 31 are suspended from the regulating bolts or screws 32 on the frame bars 9 and these screws form adjustable stops for limiting the upward movement of the carrier 22 as it will be seen from an inspection of Fig. 3.

Obviously, by placing the proper quota of buns in a pan (not shown) and slipping the pan onto the rack in the carrier plate 22, and then depressing the pedal 16, the carrier plate, by action of the upward lifting rod or shaft 19 will move upwardly to bring the buns against the underside of the backing plate 29 and this will compress the dough and flatten the products to the desired degree, making all of them uniform and accomplishing the operation with a single thrust of the shaft 19.

Then the shaft is dropped, and the pan with the flattened product is slipped out. Whenever it is desired to impress or crease the rolls for ornamental and taste purposes, the device 27 is removed, and the creasing or impression device 28 is substituted. This device 28 merely comprises a grid-like portion made up of a plurality of U-shaped rods 33 arranged in spaced parallelism and having their end portions 34 attached to suspension strips 35, these strips having screw-threaded holes to accommodate the aforesaid bolts 32.

Consequently, the complete structure is of a diversified character and the devices 27 and 28 are interchangeable so that it is possible to accomplish two distinct operations for buns and rolls, thus producing a machine which is characterized by economy, simplicity, compactness and convenience of arrangement of parts.

The gist of the inventive conception is in the provision of a table-like supporting structure which is constructed at its top to accommodate interchangeable and detachable accessories, one for simultaneously compressing and flattening a multiplicity of buns, and the other for indenting or creasing rolls, whereby to overcome the laborious hand method which is slow, unsanitary, and not reliable because of varying pressures.

As a matter of fact, a device of this kind including a platform or carrier to accommodate the pan and to raise it in engagement with the treatment accessory at the top is expeditious, dependable, provides for uniform work, and accomplishes the result with such effectiveness as to make the invention a contrasting improvement over the slow hand methods employing make-shift devices.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

A dough treating device comprising a frame, a vertically movable rod carried thereby, a pedal lever connected with the lower end of the rod for actuating the same, a pan carrier connected with the upper end of the rod, a substantially U-shaped member having outwardly extending portions connected with the extremities of its limbs and vertically arranged screws passing through top parts of the frame and through such outwardly extending portions, the bight part of said U-shaped member contacting the dough in the pan on the carrier, when the carrier is raised, said screws acting as adjustable stops for limiting the upward movement of the pan carrier.

In testimony whereof we affix our signatures.

VICTOR HERMAN MICHAELIS.
WILLIAM IRVING JASINSKY.